US012570309B2

(12) United States Patent
Yang

(10) Patent No.: US 12,570,309 B2
(45) Date of Patent: Mar. 10, 2026

(54) SYSTEMS AND METHODS OF CALIBRATING SENSORS FOR AN AUTONOMOUS VEHICLE

(71) Applicant: Kodiak Robotics, Inc., Mountain View, CA (US)

(72) Inventor: David Yang, Cupertino, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 293 days.

(21) Appl. No.: 17/938,210

(22) Filed: Oct. 5, 2022

(65) Prior Publication Data

US 2024/0116531 A1    Apr. 11, 2024

(51) Int. Cl.
*B60W 60/00*    (2020.01)

(52) U.S. Cl.
CPC ....... *B60W 60/001* (2020.02); *B60W 2300/14* (2013.01); *B60W 2420/403* (2013.01)

(58) Field of Classification Search
CPC ........... B60W 60/001; B60W 2300/14; B60W 2420/403
See application file for complete search history.

(56) References Cited

U.S. PATENT DOCUMENTS

2018/0284243 A1* 10/2018 Wood ................... G05D 1/0234
2020/0183008 A1* 6/2020 Chen ....................... G01S 17/88
2020/0300967 A1* 9/2020 Demerly ............... G01S 17/931
2022/0144185 A1    5/2022 Burnette et al.
2022/0343656 A1* 10/2022 Rachman ............... G06V 20/56
2023/0242132 A1* 8/2023 Boka ................. B60W 50/0205
701/29.7

FOREIGN PATENT DOCUMENTS

DE        102017011177 A1 *  6/2019  ............... G06T 7/60
KR         20180065049 A  *  6/2018  ............ B60W 50/14

* cited by examiner

*Primary Examiner* — Aniss Chad
*Assistant Examiner* — Nikki Marie M Molina
(74) *Attorney, Agent, or Firm* — Michele V. Frank; Venable LLP

(57)        ABSTRACT

Systems and methods of calibrating sensors for an autonomous vehicle. A method includes detecting a first vehicle feature of the autonomous vehicle from one or more first sensors, detecting a second vehicle feature of the autonomous vehicle from one or more second sensors, and calibrating the one or more second sensors with the one or more first sensors based on the first vehicle feature and the second vehicle feature. A system includes one or more first sensors, one or more second sensors, and one or more controllers. The one or more controllers detect a first vehicle feature from the one or more first sensors, detect a second vehicle feature from the one or more second sensors, and calibrate the one or more second sensors with the one or more first sensors based on the first vehicle feature and the second vehicle feature.

36 Claims, 9 Drawing Sheets

600

605 — Receive first sensor signal(s) from first sensor(s)

610 — Receive second sensor signal(s) from second sensor(s)

615 — Detect trailer from the first sensor signal(s)

620 — Detect trailer from the second sensor signal(s)

625 — Calibrate the second sensor(s) with the first sensors(s) based on the detected trailer

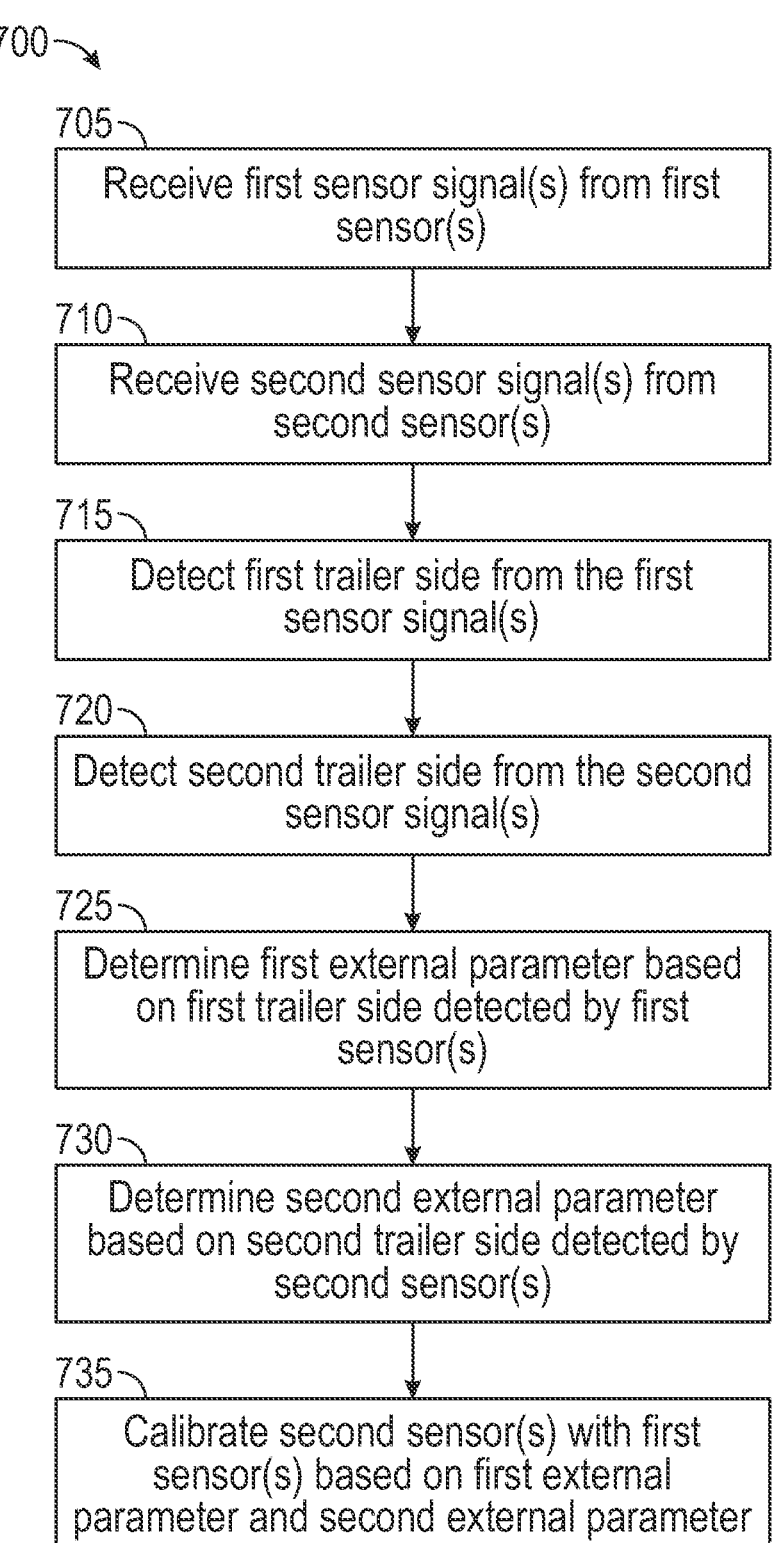

700

705  Receive first sensor signal(s) from first sensor(s)

710  Receive second sensor signal(s) from second sensor(s)

715  Detect first trailer side from the first sensor signal(s)

720  Detect second trailer side from the second sensor signal(s)

725  Determine first external parameter based on first trailer side detected by first sensor(s)

730  Determine second external parameter based on second trailer side detected by second sensor(s)

735  Calibrate second sensor(s) with first sensor(s) based on first external parameter and second external parameter

FIG. 7

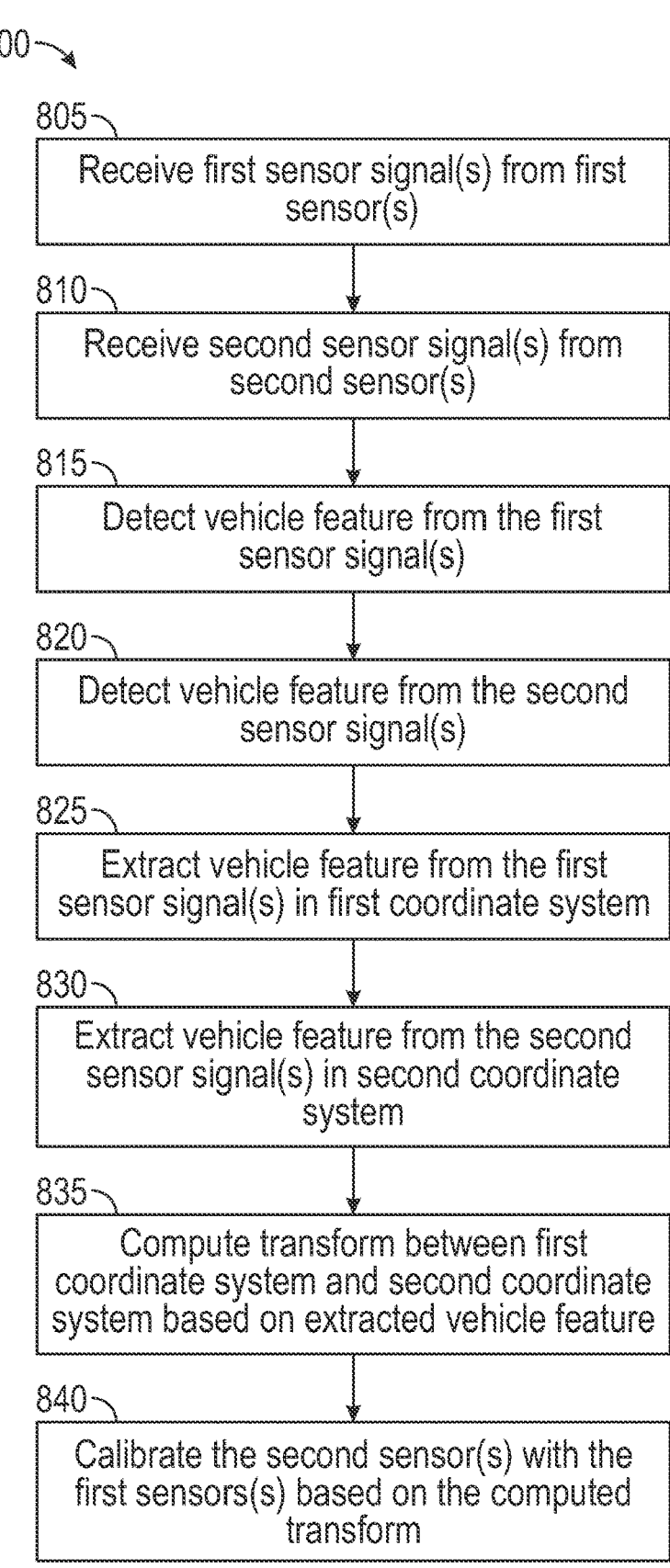

800

805
Receive first sensor signal(s) from first sensor(s)

810
Receive second sensor signal(s) from second sensor(s)

815
Detect vehicle feature from the first sensor signal(s)

820
Detect vehicle feature from the second sensor signal(s)

825
Extract vehicle feature from the first sensor signal(s) in first coordinate system 830
Extract vehicle feature from the second sensor signal(s) in second coordinate system 835
Compute transform between first coordinate system and second coordinate system based on extracted vehicle feature 840
Calibrate the second sensor(s) with the first sensors(s) based on the computed transform

FIG. 8

SYSTEMS AND METHODS OF CALIBRATING SENSORS FOR AN AUTONOMOUS VEHICLE

TECHNICAL FIELD

The present disclosure relates to systems and methods of calibrating sensors for an autonomous vehicle.

BACKGROUND

Vehicles, such as cars, trucks, motorcycles, or the like, may include one or more sensors so that the vehicle can operate autonomously or semi-autonomously. The sensors may be equipped to gather data and information, communicate with the vehicle, and may assist in navigating the vehicle.

BRIEF SUMMARY

According to one embodiment, a method of calibrating sensors for an autonomous vehicle includes detecting a first vehicle feature of the autonomous vehicle from one or more first sensors of the autonomous vehicle, detecting a second vehicle feature of the autonomous vehicle from one or more second sensors of the autonomous vehicle, and calibrating the one or more second sensors with the one or more first sensors based on the first vehicle feature and the second vehicle feature.

According to another embodiment, a system for calibrating sensors for an autonomous vehicle includes one or more first sensors, one or more second sensors, and one or more controllers configured to detect a first vehicle feature of the autonomous vehicle from the one or more first sensors, detect a second vehicle feature of the autonomous vehicle from the one or more second sensors, and calibrate the one or more second sensors with the one or more first sensors based on the first vehicle feature and the second vehicle feature.

According to another embodiment, a tangible non-transitory computer-readable storage media stores computer-executable instructions executable by one or more processors, the computer-executable instructions including one or more instructions to detect a first vehicle feature of an autonomous vehicle from one or more first sensors of the autonomous vehicle, detect a second vehicle feature of the autonomous vehicle from one or more second sensors of the autonomous vehicle, and calibrate the one or more second sensors with the one or more first sensors based on the first vehicle feature and the second vehicle feature.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 7 is a flow diagram of a method of calibrating sensors for an autonomous vehicle, according to another embodiment of the present disclosure.

FIG. 8 is a flow diagram of a method of calibrating sensors for an autonomous vehicle, according to another embodiment of the present disclosure.

DETAILED DESCRIPTION

Figure 1:
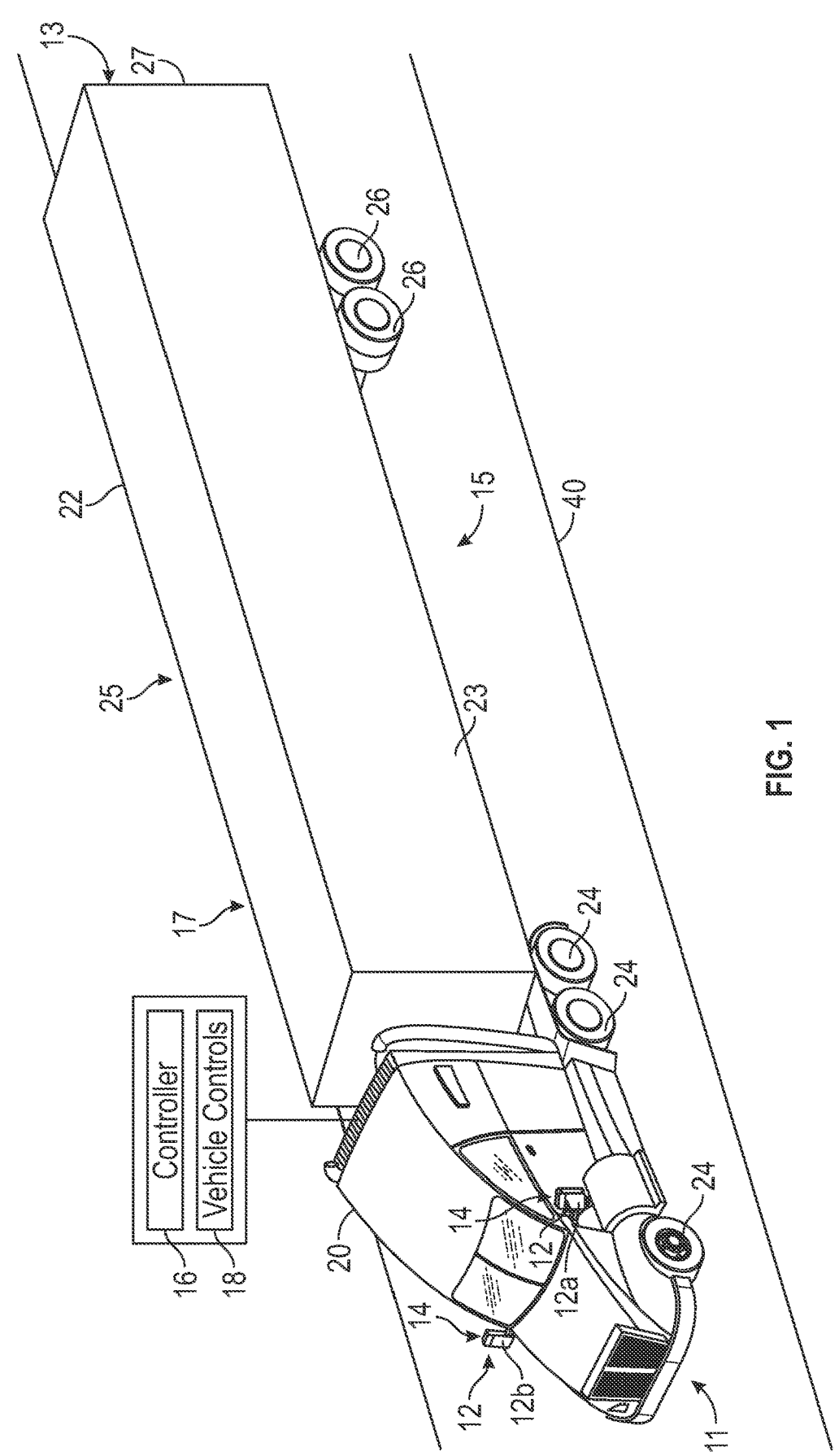
FIG. 1 is a schematic, perspective view of an autonomous vehicle having one or more sensor assemblies, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second,", "third," etc., may be used interchangeably to distinguish one component from another and are not intended to signify location or importance of the individual components.

The terms "forward" and "rearward" refer to relative positions of a vehicle. For example, forward refers to a position closer to front hood, front bumper, or front fender of the vehicle and rearward refers to a position closer to a rear bumper, rear trunk, or trailer of the vehicle.

The term "side" as used herein may refer to a surface, wall, edge, border, boundary, etc., or simply to a general position or location with respect to the described component (e.g., not referring to any physical component).

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

As used herein, "automated," "autonomous," or "automatic," are used to describe functions that are done without user intervention (e.g., by a controller).

As used herein, "calibration" or "sensor calibration" includes an adjustment or set of adjustments performed on a sensor to make the sensor function accurately and/or substantially error free.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values and/or endpoints defining range(s) of values.

An autonomous vehicle is a vehicle that incorporates vehicular automation and that can sense the environment around the vehicle and can operate with little to no human input. Autonomous vehicles include various sensors to sense the environment. Control systems interpret the sensor information to identify navigation paths and to automatically control the autonomous vehicle. Autonomous vehicles include one or more sensors that gather data and information, communicate with the autonomous vehicle, and may assist in navigating the autonomous vehicle. The one or more sensors may include a plurality of redundant sensors (e.g., multiple sensors of the same type that measure the same type of data). The sensors may include, for example, cameras, lidars, radars, inertial measurement units (IMU), global positioning systems (GPS), or the like. One or more vehicle controllers receive the data and information from the one or more sensors to autonomously control and navigate the autonomous vehicle. For example, the one or more vehicle controllers automatically control one or more control systems (e.g., steering, power, throttle, brakes, etc.) of the autonomous vehicle to control the autonomous vehicle.

The sensors need to be calibrated in order for the vehicle controllers to interpret the sensor data and accurately detect objects in the environment about the vehicle. For example, calibration of the sensors includes an adjustment or set of adjustments performed on a sensor to make the sensor function as accurate, or as error free, as possible. Calibration includes intrinsic calibration and extrinsic calibration of the sensors. Intrinsic calibration includes a calibration of the internal parameters of a particular sensor for accurate output measurements of the sensor. The values or parameters in an intrinsic calibration include, for example, the angle of lidar beams, the type of lens being used in a camera including the focus point, the focal length, skew, lens distortion, etc., or any other internal parameter of a particular sensor. The intrinsic calibration includes calibration of a single sensor and is typically performed by the sensor manufacturers prior to the sensors being deployed for a particular application. Extrinsic calibration includes a calibration of a first sensor with respect to a second sensor in order to define how the sensors are located and oriented with respect to each other. For example, the extrinsic calibration defines how the sensors are related to each other or to some fixed coordinate system including the physical distance along each axis with respect to each other, and the orientation of the coordinate system of each sensor relative to the fixed coordinate system. The extrinsic calibration typically requires output from multiple sensors.

The extrinsic calibration can be performed the first time the vehicle and the sensors are powered on. In some instances, the sensors may become uncalibrated such that the sensors need to be recalibrated after the initial calibration. For example, one or more of the sensors may be moved or otherwise may change orientation (e.g., could be bumped or the like) while the vehicle is operating such that the sensors become uncalibrated. Typically, extrinsic calibration requires having different features that the different sensors can identify and use to help calibrate the sensors. For example, the extrinsic calibration includes taking data from each sensor and matching features between each sensor output. A feature is more useful in the calibration if the feature is known (e.g., the controller knows what to detect within the sensor data) and the feature is consistent (e.g., the same feature is used every time the sensors are calibrated). For example, a marker (e.g., a marker with a checkerboard pattern) is typically used and placed in the field of view of the sensors for the calibration. The checkerboard pattern is distinct and easy to detect in an image and the controller can easily identify the corners of the squares in the checkerboard pattern to define coordinates of the edges of the checkerboard pattern.

The controller performs the extrinsic calibration by defining coordinates of the checkboard pattern within the coordinate system of each sensor. Each sensor will have a different coordinate system due to the different locations and orientations of the sensors with respect to each other. The controller calibrates the sensors by performing a transform of the coordinates of one sensor into the coordinates of another sensor or into a separate coordinate system. For example, the controller can transform the coordinates of the checkboard pattern from the lidar data into the coordinate system of the camera such that the coordinates from the lidar data aligns with the coordinates of the checkerboard pattern from the camera. Calibrating the sensors using such a marker, however, requires a human operator to place the marker in the field of view of the sensors every time the sensors need to be calibrated. Such a process is slow and may not be possible if the vehicle is being operated autonomously without a human operator when the sensors need to be calibrated.

Accordingly, a system and method of sensor calibration is needed that utilizes a feature of the vehicle that can be used in the calibration process without the need for a human operator to be present for the calibration. In some embodiments, the feature is a feature of the trailer of the vehicle when the vehicle is a truck. The trailer provides for a consistent (e.g., flat walls of a box, has wheels, etc.) and known feature that the controller can easily detect within the sensor data for the calibration process. The trailer provides for a consistency that is atypical in applications other than trucking. However, the systems and methods herein can be used for any type of vehicle that operates autonomously or semi-autonomously. In some embodiments, the feature may include a stickable marker that can be quickly attached to the trailer and removed from the trailer. The calibration process detailed herein includes identifying that a trailer is attached to the vehicle and that the trailer is sensed by at least two sensors.

The embodiments of the present disclosure provide for an extrinsic calibration of the sensors of the vehicle to determine relative sensor orientations such that the controllers can more accurately detect objects about the vehicle. The trailer enables determining the relative sensor orientations when the sensors can see or otherwise observe the trailer (e.g., the trailer, or portions thereof, is in the field of view of the sensors). The embodiments of the present disclosure can be used to calibrate any type of sensor used on the vehicle to determine how the sensors are oriented with respect to each other. For example, the calibration methods herein can be used for lidar to lidar extrinsic calibration (e.g., left lidar to right lidar), camera to lidar extrinsic calibration (e.g., left rear-facing camera to left lidar or right rear-facing camera to right lidar), radar to camera extrinsic calibration (e.g., left rear-facing radar to left rear-facing camera or right rear-facing radar to right rear-facing camera), radar to lidar extrinsic calibration (e.g., left rear-facing radar to left lidar or right rear-facing radar to right lidar), and/or any other extrinsic calibration for any type of sensors. In this way, the calibration methods of the present disclosure may be used for calibrating the same type of sensors (e.g., lidar to lidar, camera to camera, radar to radar) and/or for calibrating different types of sensors (e.g., lidar to camera, radar to lidar, radar to camera).

The calibration of the same type of sensors includes the following steps. First, the controllers read the timestamped data from each sensor. The controllers can read the time-stamped data and perform the calibration while the vehicle is either online (e.g., operating in an autonomous mode) or offline (e.g., operating without the autonomous mode). The timestamped data from the lidars can include point cloud data. Point cloud data includes a set of data points in space and represents a 3D object in a Cartesian coordinate system (e.g., X, Y, Z coordinates). The timestamped data from the cameras includes one or more images from the cameras. The timestamped data from the radars includes information of radio waves that are reflected off of an object including, for example, the location of the object in space. Next, the controllers conduct an optimization process to optimize the extrinsic calibration between the two sensors using trailer sides being parallel as a cost function. The optimization process includes putting the output of one sensor into the coordinate system of the other sensor or into an intermediate coordinate system. For example, the controllers know that the trailer walls are parallel and can determine the orienta-tion of the sensors in relation to each sensor based on the trailer walls being parallel. Accordingly, the controllers use the trailer as a feature in the calibration process. The calibration process for the same type of sensors is detailed further below with respect to FIG. 7.

The calibration of different types of sensors includes the following steps. First, the controllers read the timestamped data from each sensor (e.g., either online or offline). Next, the controllers identify some trailer feature that is visible to the different sensors. The trailer feature can include, for example, the trailer wheels, the edge of the trailer, the side of the trailer, an attached marker, or any feature of the trailer. Next, the controllers solve an optimization problem to optimize the extrinsic calibration between the different sen-sors. For example, the lidar data is projected to the camera image using the extrinsic calibration guess and taking into account the intrinsic parameters of the sensors. The cost for the optimization problem is the deviation of the lidar and the camera features in the image. For example, the lidar data of the trailer feature will be deviated from the camera data of the trailer feature due to the different orientations of the lidar and the camera. The calibration process includes calculating and performing a transform of the lidar data to the camera data such that the lidar data is overlayed on the camera data and the trailer feature from the lidar data aligns with the trailer feature from the camera data. Accordingly, the trailer is used as a known and consistent feature in the calibration process and the different sensors sense the same trailer feature. While a lidar and camera are discussed herein, the calibration process can be used for any type of sensors. The calibration process for different types of sensors is detailed further below with respect to FIG. 8.

In some embodiments, the extrinsic calibration is per-formed while the vehicle is moving. While the vehicle is moving, relative motion between the vehicle and the trailer generates additional positions in the timestamped data. For example, a parameter of the trailer (e.g., the angle of the trailer with respect to the vehicle) as determined with the sensors changes as the vehicle moves. Accordingly, per-forming the extrinsic calibration while the vehicle is moving provides for additional factors for the calibration process, thereby allowing for a more accurate calibration of the sensors.

As detailed above, the features in the calibration process typically have to be inferred or found or another known target or marker has to be made. Utilizing the trailer in the calibration process provides for a known and consistent feature that the controller can detect in the sensor data. In this way, the controllers can more easily and quickly per-form the calibration process because the controllers know to detect a trailer and the trailer is typically the same or similar for every application. Accordingly, the embodiments of the present disclosure provide for an improved calibration pro-cess for calibrating the sensors of a vehicle that can be performed without a human operator being present.

Referring now to the drawings, FIG. 1 is a schematic, perspective view of an autonomous vehicle 10 having one or more sensor assemblies 12, according to an embodiment of the present disclosure. The autonomous vehicle 10 may be any motor vehicle, such as, for example, but not limited to a car, a truck, a commercial truck, a bus, a watercraft (e.g., boat, ship, underwater vehicles, etc.), a motorcycle, an aircraft (e.g., airplane, helicopter, etc.), or any other type of vehicle. For ease of description, the autonomous vehicle 10 may be referred to herein as a truck. Further, while reference is made to an autonomous vehicle herein, the embodiments of the present disclosure may be used in autonomous vehicles or semi-autonomous vehicles (e.g., vehicles with some human input) and may be used in vehicles that are operated manually by a human operator in the vehicle or remote from the vehicle and have some aspects controlled autonomously. The autonomous vehicle 10 includes a for-ward end 11, also referred to as a forward side, a front side, or a front end, and a rear end 13, also referred to as a rear side, rearward end, or rearward side. The autonomous vehicle 10 also includes a first side 15, also referred to as a driver side, and a second side 17, also referred to as a passenger side. The autonomous vehicle 10 includes one or more sensor assemblies 12 having a plurality of sensors 14, a controller 16, and vehicle controls 18. When the autono-mous vehicle 10 is a truck, the autonomous vehicle 10 includes a tractor unit 20 that is configured to support and tow a trailer 22, such as a semitrailer. The tractor unit 20 includes tractor unit wheels 24 that enable the tractor unit 20 to maneuver about a road 40 or other ground surface.

The trailer 22 is pivotably coupled to the tractor unit 20 such that the tractor unit 20 can rotate (e.g., turn) with respect to the trailer 22. The trailer 22 includes trailer wheels 26 that enable the trailer 22 to maneuver about the road 40 or other ground surface. The trailer 22 includes a first trailer side 23 located on the first side 15 of the autonomous vehicle 10 and a second trailer side 25 located on the second side 17 of the autonomous vehicle 10. The second trailer side 25 is opposite the first trailer side 23 and is generally parallel with the first trailer side 23. The trailer 22 also includes one or more trailer edges 27 that define an outer perimeter of the trailer 22.

The sensor assemblies 12 may assist in navigation of the autonomous vehicle 10. In some examples, the sensor assemblies 12 may assist in navigation in a manner that results in the autonomous vehicle 10 being autonomous, self-driving, semi-autonomous, non-autonomous with assisted navigation, etc., or combinations thereof. In this regard, the sensor assemblies 12 may include components, such as, but not limited to, sensors or other devices, that may be useful for the operation of the vehicle, or any combina-tion thereof. The autonomous vehicle 10 may use (via the controller 16) data collected by the plurality of sensors 14 to navigate or to assist in navigating the autonomous vehicle 10 along the road 40 and to control the vehicle controls 18 to control the speed, the direction, the braking, and other functions of the autonomous vehicle 10. By way of example, the sensor assemblies 12 may be, or may include the sensors, cameras, mirrors, and associated components of, the sensor assembly described in U.S. Patent Application Publication No. US2022/0144185, the contents of which are herein incorporated by reference in their entirety. For example, the sensor assemblies 12 may be a side mirror assembly mounted to the autonomous vehicle 10. The sensor assemblies 12 may include a first sensor assembly 12a and a second sensor assembly 12b. The first sensor assembly 12a is located on the first side 15 of the autonomous vehicle 10 and the second sensor assembly 12b is located on the second side 17 of the autonomous vehicle 10. The sensor assemblies 12 may take any form, may include any number of sensor assemblies, and may be located and mounted at any location on the autonomous vehicle 10, as desired.

Figure 2:
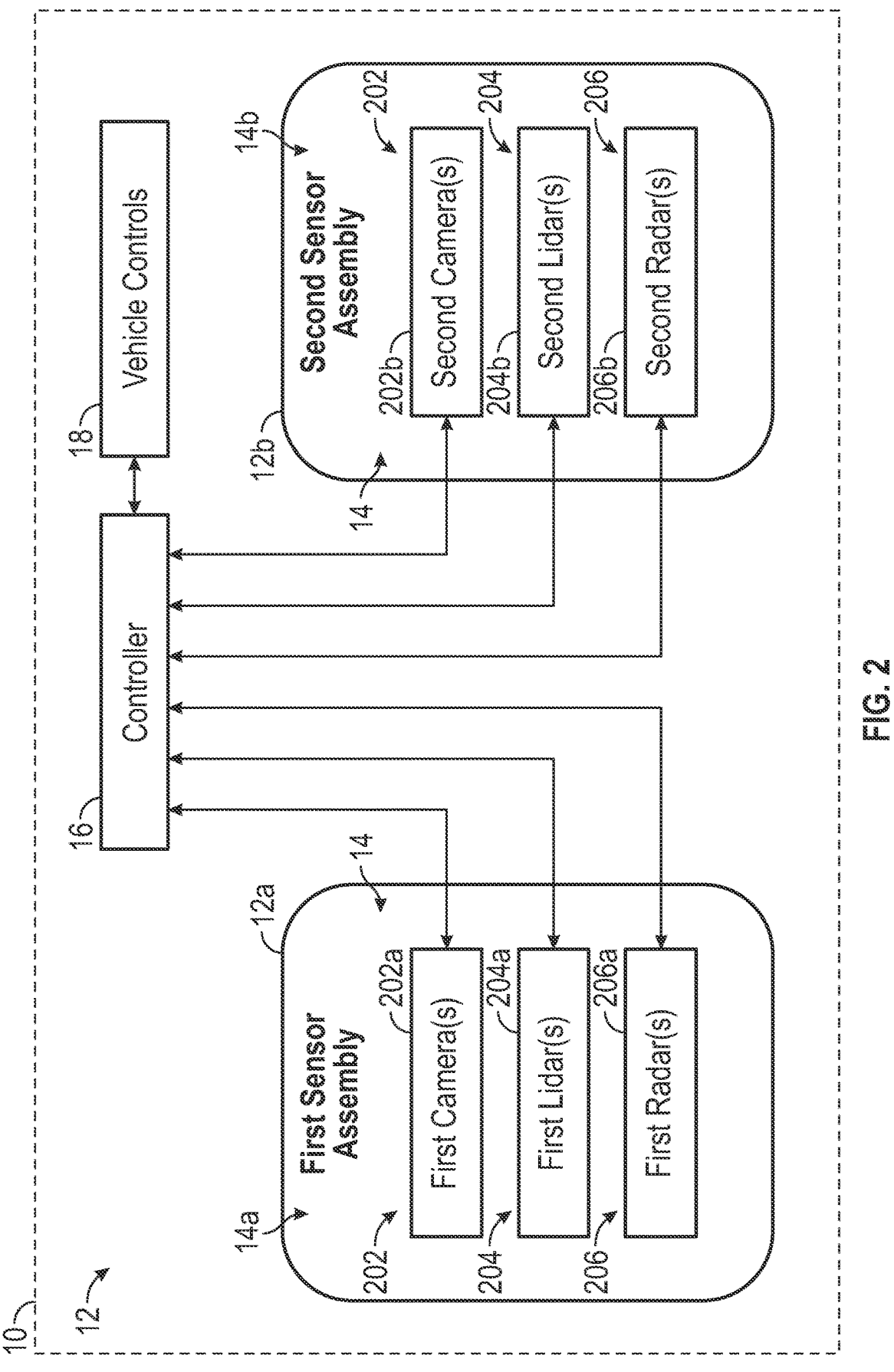
FIG. 2 is a schematic view of a sensor assembly for the autonomous vehicle of FIG. 1, according to an embodiment of the present disclosure.

FIG. 2 is a schematic view of the sensor assemblies 12 for the autonomous vehicle 10, according to an embodiment of the present disclosure. In FIG. 2, the autonomous vehicle 10 is represented schematically in dashed lines. The sensor assemblies 12 include a variety of sensors to monitor the surroundings of the autonomous vehicle 10. The plurality of sensors 14 of the sensor assembly 12 may include, for example, but not limited to, one or more cameras 202, one or more lidars 204, one or more radars 206, one or more global positioning systems (GPS), and one or more inertial measurement units (IMUs). The combined data from the plurality of sensors 14 may be used by a processor (e.g., the controller 16) to autonomously (or semi-autonomously) navigate or to assist a driver in navigating the roadway in a variety of light conditions, weather conditions, traffic conditions, load conditions, road conditions, etc. The sensors and the other features of the plurality of sensors 14 are configured and oriented to provide a predetermined field of view and to provide reliable, accurate, and high-quality data for autonomous and semi-autonomous driving. The cameras 202 may include a plurality of cameras 202 including one or more cameras 202 facing the forward end 11 (FIG. 1), one or more cameras facing the rear end 13 (FIG. 1), and one or more cameras facing a lateral side perpendicular to the forward end and rear end (e.g., the first trailer side 23 (FIG. 1) and/or the second trailer side 25 (FIG. 1)). In some examples, the cameras 202 may include narrow field of view camera(s), thermal camera(s), wide field of view camera(s), side-facing camera(s), and/or e-mirror camera(s). The cameras 202 generate camera data that includes one or more images. The controller 16 can detect objects in the camera data and generate coordinates of the objects in a Cartesian coordinate system. The aforementioned cameras are merely exemplary, and any number or type of cameras may be included to facilitate the autonomous, semi-autonomous, or assisted navigation of the autonomous vehicle 10, including, the cameras described in U.S. Patent Application Publication No. US2022/0144185.

The lidars 204, the radars 206, the GPS, the IMUs, and the cameras 202 all provide information and data to autonomously or semi-autonomously operate and navigate the autonomous vehicle 10 and/or provide information and data to assist in the navigation of the autonomous vehicle 10 where an operator is present inside the cab of the autonomous vehicle 10. The lidars 204 may assist in tracking vehicles or objects passing or being passed by the autonomous vehicle 10. For example, as a car passes the autonomous vehicle 10, the appearance of the car may change as it is captured first from the front, then from the side, and then from behind, and therefore tracking of the car by camera may be difficult. The lidars 204, however, may provide a continuous signal corresponding to the car that enables the autonomous vehicle 10 to track the car as it passes. The lidars 204 may also be particularly useful at night, when visible light is limited, and therefore the camera signals are weaker. The lidars 204 may be configured to detect objects within a radius of about 75 meters, for example. According to one aspect, the lidar 204 may be configured to detect objects within a radius of about 50 meters. The lidars capture lidar data that includes point cloud data including data of objects in a Cartesian coordinate system.

The radars 206 may enable the autonomous vehicle 10 to navigate in difficult weather and light conditions. The radars 206 may supplement the information from the cameras 202 and from the lidars 204, which may have difficulty obtaining clear images and signals in the presence of certain weather conditions, such as fog, rain, and snow. The radars 206 may also provide information regarding objects that are occluded in the camera data and the lidar data. For example, the radars 206 may detect a car in front of the autonomous vehicle 10, as well as a motorcycle in front of the car. In contrast, if the motorcycle is completely obscured by the car, the cameras 202 and the lidar 204 may not detect the motorcycle. The radars 206 generate radar data that includes radio waves that are reflected off of objects and includes information that the controller 16 can use to determine the location of the objects in a Cartesian coordinate system.

In an example, the cameras 202 may track vehicles or objects and assist in tracking of the vehicles or of the objects. The GPS can provide a geolocation of the autonomous vehicle 10 and can communicate with other GPS systems to provide geolocations of other vehicles around the autonomous vehicle 10. Thus, the plurality of sensors 14 of the sensor assemblies 12 can sense an environment of the autonomous vehicle 10 including, for example, objects around the autonomous vehicle 10, a road on which the autonomous vehicle 10 is operating, curvature of the road, slope of the road, weather conditions, light conditions, and other information regarding the environment about the autonomous vehicle 10.

As shown in FIG. 2, the sensor assemblies 12 includes the first sensor assembly 12a and the second sensor assembly 12b. The first sensor assembly 12a includes one or more first sensors 14a and the second sensor assembly 12b includes one or more second sensors 14b. The one or more first sensors 14a include one or more first cameras 202a, one or more first lidars 204a, and one or more first radars 206a. The one or more second sensors 14b include one or more second cameras 202b, one or more second lidars 204b, and one or more second radars 206b. Each of the plurality of sensors 14 of the respective sensor assemblies 12 are positioned at different locations on the sensor assemblies 12 such that each of the plurality of sensors 14 have different fields of view, as detailed further below.

The controller 16 is in two-way communication with each of the plurality of sensors 14. In this way, the controller 16 sends and/or receives the data from the plurality of sensors 14 and controls the vehicle controls 18. The vehicle controls 18 include systems for controlling operation of the autonomous vehicle 10 to autonomously or semi-autonomously control the autonomous vehicle 10. The systems include, for example, an engine, a steering system, a braking system, and other systems that control operation of the autonomous vehicle 10. The engine may include any type of engine, for example, an internal combustion engine, an electric motor, a hybrid-electric engine, or other types of power units for propelling, for moving, or for powering the autonomous vehicle 10. The vehicle controls 18 include actuators or other devices that control fuel flow, acceleration (e.g., a throttle), steering, braking, or other vehicle controls of the autonomous vehicle 10. Thus, the controller 16 controls the vehicle controls 18 to propel, move, steer, accelerate, and stop the autonomous vehicle 10.

Figure 3:
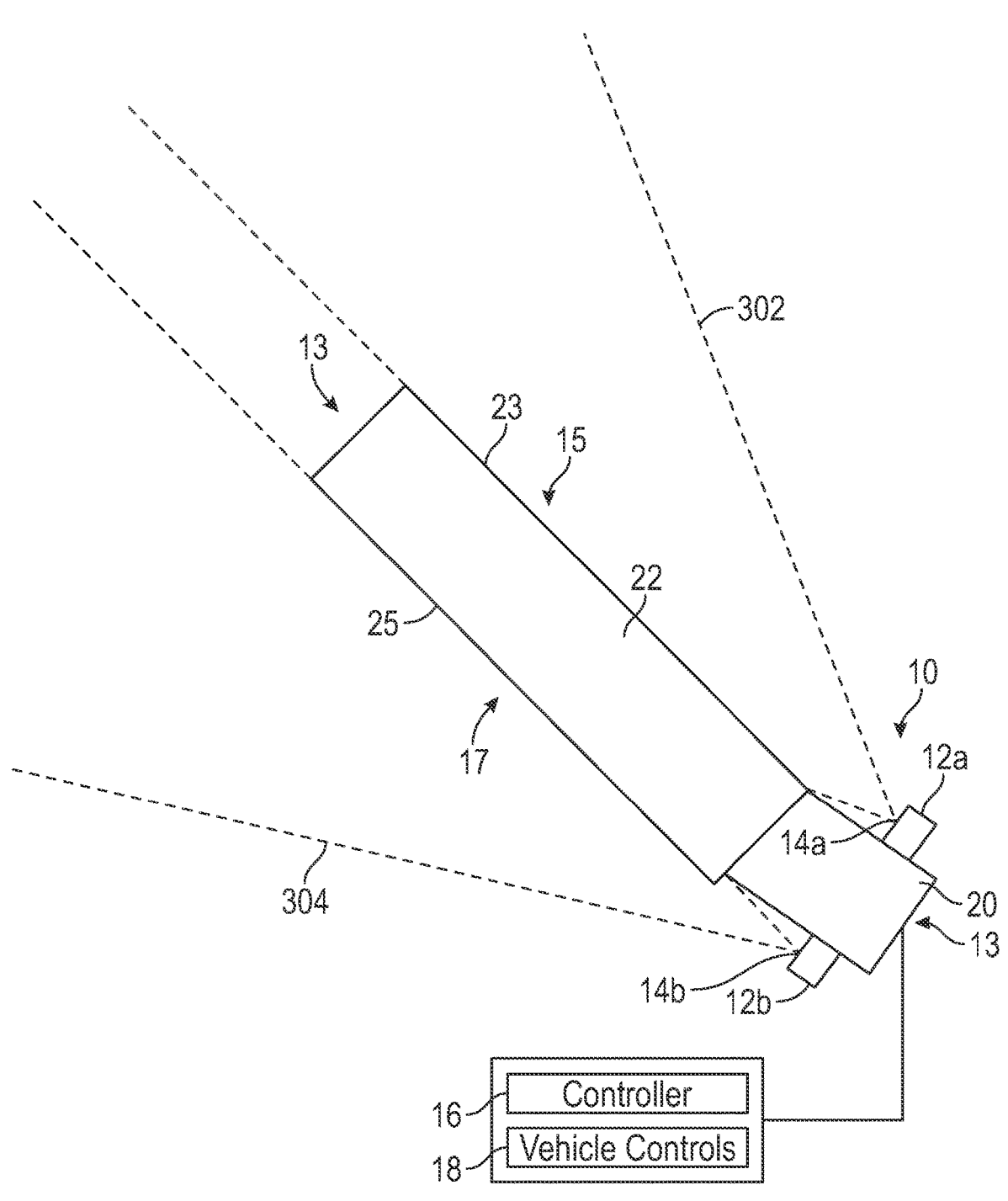
FIG. 3 is a schematic, top view of the autonomous vehicle of FIG. 1, according to an embodiment of the present disclosure.

FIG. 3 is a schematic, top view of the autonomous vehicle 10, according to an embodiment of the present disclosure. FIG. 3 shows the first trailer side 23 and the second trailer side 25 are generally parallel. The first sensors 14a of the first sensor assembly 12a have a first field of view 302 that captures a first vehicle feature such as the first trailer side 23, and/or other components of the first side 15 of the autonomous vehicle 10. The second sensors 14b of the second sensor assembly 12b have a second field of view 304 that captures a second vehicle feature such as the second trailer side 25 and/or other components of the second side 17 of the autonomous vehicle 10. The controller 16 extracts the first vehicle feature and the second vehicle feature and determines an external parameter of the autonomous vehicle 10 over time based on the extracted first vehicle feature and the extracted second vehicle feature. For example, the external parameter may be an angle of the trailer 22 with respect to the tractor unit 20 as the autonomous vehicle 10 operates (e.g., turns). Due to the various fields of view (e.g., the first field of view 302 and the second field of view 304) of the first sensors 14a and the second sensors 14b, the external parameter that is determined by the controller 16 may be different from the different sensors. Accordingly, the controller 16 needs to calibrate the first sensors 14a with the second sensors 14b such that the external parameter determined by the controller 16 from the first sensors 14a is substantially the same as the external parameter determined by the controller 16 from the second sensors 14b, as detailed further below.

Figure 4:
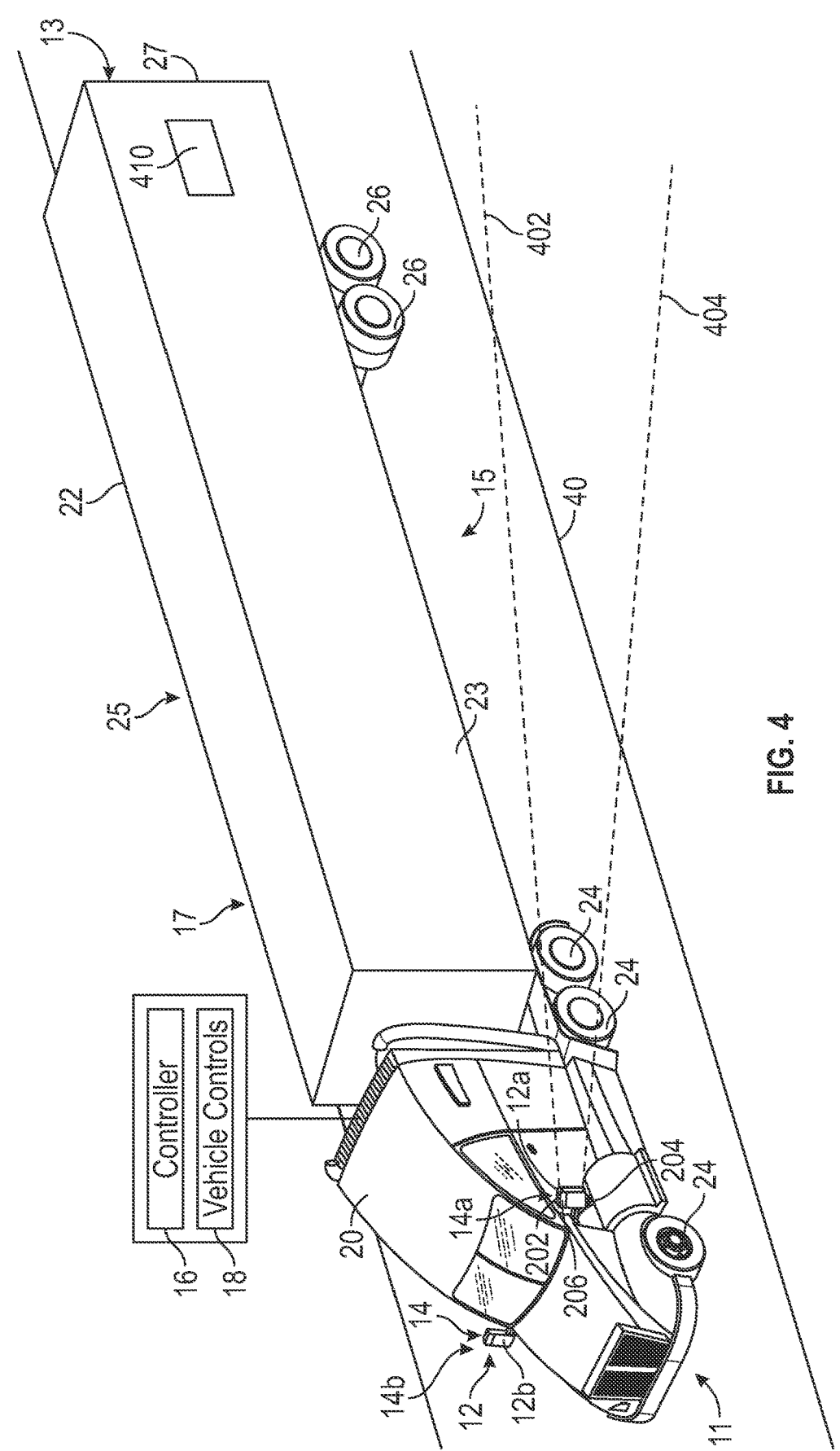
FIG. 4 is a schematic, perspective view of the autonomous vehicle of FIG. 1, according to an embodiment of the present disclosure.

FIG. 4 is a schematic, perspective view of the autonomous vehicle 10, according to an embodiment of the present disclosure. FIG. 4 shows that the various sensors 14 on the respective sensor assemblies 12 each have different fields of view. For example, the one or more cameras 202 on the first sensor assembly 12a are positioned on the first sensor assembly 12a at a first location and have a first field of view 402. The one or more lidars 204 of the first sensor assembly 12a are positioned on the first sensor assembly 12a at a second location and have a second field of view 404. The second field of view 404 is different than the first field of view 402. The one or more radars 206 similarly have a third field of view that is different than the first field of view 402 and the second field of view 404. The cameras 202, the lidars 204, and the radars 206 of the second sensor assembly 12b similarly have different fields of view with respect to each other.

The one or more cameras 202 are oriented such that the first field of view 402 captures a vehicle feature of the autonomous vehicle 10. Similarly, the one or more lidars 204 are oriented such that the second field of view 404 captures the vehicle feature of the autonomous vehicle 10. The one or more radars 206 similarly capture the vehicle feature. The vehicle feature may include any vehicle feature of the autonomous vehicle 10, such as the first trailer side 23 (or the second trailer side 25), the one or more trailer edges 27, the tractor unit wheels 24, the trailer wheels 26, a stickable marker 410, or any other feature of the autonomous vehicle 10. The stickable marker 410 includes a marker or a target of a known shape and size that can be applied to the autonomous vehicle 10 (e.g., the first trailer side 23 and/or the second trailer side 25) for a sensor calibration process and removed when the sensor calibration process is complete, as detailed further below. For example, a first stickable marker can be applied to the first trailer side 23 and a second stickable marker can be applied to the second trailer side 25. In some examples, the stickable marker 410 includes a checkerboard pattern such that the plurality of sensors 14 can extract features of the checkerboard pattern including edges of the stickable marker 410 and locations of the checkerboard grid.

Due to the various fields of view of the plurality of sensors 14 of a respective sensor assembly 12 being different, each of the plurality of sensors 14 captures the vehicle feature at a different orientation. For example, the one or more cameras 202 include a first coordinate system having a first orientation due to the first field of view 402. The one or more lidars 204 include a second coordinate system having a second orientation due to the second field of view 404. The second coordinate system and the second orientation are different than the first coordinate system and the first orientation. The one or more radars 206 similarly have a third coordinate system and a third orientation that are different than the first coordinate system and the first orientation, and different than the second coordinate system and the second orientation, respectively. In this way, the one or more cameras 202 capture the vehicle feature within the first field of view 402 at the first orientation in the first coordinate system, and the one or more lidars 204 capture the vehicle feature within the second field of view 404 at the second orientation in the second coordinate system. The one or more radars 206 similarly capture the vehicle feature within the third field of view at the third orientation in the third coordinate system. The controller 16 is unable to accurately identify objects in the environment about the autonomous vehicle 10 due to the various coordinate systems and orientations of the plurality of sensors 14 (e.g., the one or more cameras 202, the one or more lidars 204, and/or the one or more radars 206) being different. Accordingly, the plurality of sensors 14 of the respective sensor assemblies 12 need to be calibrated in order to fuse the data from the various types of sensors into a common, fixed coordinate system such that the controller 16 is able to accurately identify objects in the environment about the autonomous vehicle 10 as the autonomous vehicle 10 operates, as detailed further below.

Figure 5:
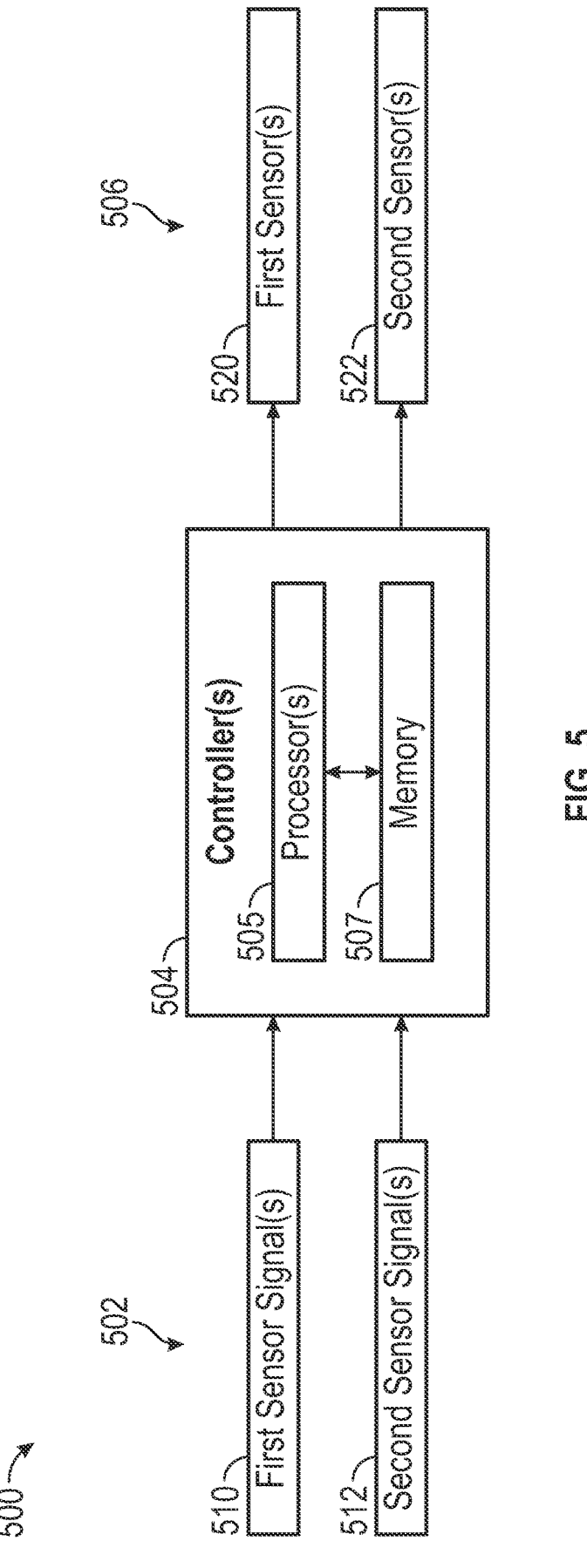
FIG. 5 is a block diagram of a sensor calibration system for the autonomous vehicle of FIG. 1, according to an embodiment of the present disclosure.

FIG. 5 is a block diagram of a sensor calibration system 500 for operation and control of at least portions of the autonomous vehicle 10, according to an embodiment of the present disclosure. The sensor calibration system 500 includes inputs 502, one or more controllers 504, and outputs 506. The inputs 502 include one or more first sensor signals 510 and one or more second sensor signals 512. The one or more first sensor signals 510 and the one or more second sensor signals 512 include data sensed or otherwise generated by one or more of the plurality of sensors 14. The outputs 506 include one or more first sensors 520 and one or more second sensors 522. The outputs 506 may include calibration of the second sensors 522 with the first sensors 520 such that the one or more controllers 504 can accurately detect objects about the autonomous vehicle 10. The one or more controllers 504 receive the inputs 502, implement a method of calibrating sensors of the autonomous vehicle 10 (FIGS. 1 to 4), and control the outputs 506, as detailed with reference to FIGS. 6 to 8 below.

With reference to FIGS. 1 to 4, in some examples, the one or more first sensor signals 510 are sensor signals from the first sensors 14a and the one or more second sensor signals 512 are sensor signals from the second sensors 14b. In this way, the one or more first sensor signals 510 and the one or more second sensor signals 512 are signals from the same type of sensors on different sides (e.g., the first sensors 14*a* on the first side 15 and the second sensors 14*b* on the second side 17) of the autonomous vehicle 10. For example, the one or more first sensor signals 510 may be signals from the one or more first cameras 202*a* and the one or more second sensor signals 512 may be signals from the one or more second cameras 202*b*. Similarly, the one or more first sensor signals 510 may be signals from the one or more first lidars 204*a* and the one or more second sensor signals 512 may be signals from the one or more second lidars 204*b*. The one or more first sensor signals 510 may be signals from the one or more first radars 206*a* and the one or more second sensor signals 512 may be signals from the one or more second radars 206*b*.

In some examples, the one or more first sensor signals 510 are signals from a first type of sensor and the one or more second sensor signals 512 are signals from a second type of sensor that is different than the first type of sensor. In this way, the one or more first sensor signals 510 and the one or more second sensor signals 512 are signals from different types of sensors on the same side (e.g., the first side 15 or the second side 17) of the autonomous vehicle 10. For example, the one or more first sensor signals 510 may be signals from the one or more cameras 202 (e.g., the first cameras 202*a* or the second cameras 202*b*) and the one or more second sensor signals 512 may be signals from the one or more lidars 204 (e.g., the first lidars 204*a* or the second lidars 204*b*). In some examples, the one or more first sensor signals 510 or the one or more second sensor signals 512 may be signals from the one or more radars (e.g., the first radars 206*a* or the second radars 206*b*).

The one or more controllers 504 may be one or more standalone controllers, such as the controller 16. In this embodiment, the one or more controllers 504 include a computing device having one or more processors 505 and a memory 507, such as the computing device detailed below with respect to FIG. 9. The processors 505 can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory 507 can include one or more computer-readable media, including, but not limited to, non-transitory computer-readable media, a computer readable non-volatile medium (e.g., a flash memory), a random-access memory (RAM), a read-only memory (ROM), hard drives, flash drives, or other memory devices. A system bus couples the various components including the memory 507 to the processors 505. Portions of the one or more controllers 504 (e.g., portions of the processors 505 and/or the memory 507) may be stored on a network, such as a cloud computing network or the like.

The memory 507 can store information accessible by the processors 505, including computer-readable instructions that can be executed by the processors 505. The instructions can be any set of instructions or a sequence of instructions that, when executed by the processors 505, cause the processors 505 and the controllers 504 to perform operations. The controllers 504 and, more specifically, the processors 505 are programmed or configured to perform these operations, such as the operations discussed further below. In some embodiments, the instructions can be executed by the processors 505 to cause the processors 505 to complete any of the operations and functions for which the controllers 504 are configured, as will be described further below. The instructions can be software written in any suitable programming language or can be implemented in hardware. Additionally, or alternatively, the instructions can be executed in logically or virtually separate threads on the processors 505. The memory 507 can further store data that can be accessed by the processors 505.

To enable user interaction with the one or more controllers 504, an input device represents any number of input mechanisms, such as a microphone for speech, a touch-sensitive screen for gesture or graphical input, keyboard, mouse, motion input, speech and so forth. The input device can be located anywhere (e.g., remote from the autonomous vehicle 10 or on the autonomous vehicle 10) and may communicate with the one or more controllers 504 by wired or wireless communication. The one or more controllers 504 can communicate with an output device. The output device can be one or more of a number of output mechanisms known to those of skill in the art, such as, for example, a display. In some instances, multimodal systems enable a user to provide multiple types of input to communicate with the one or more controllers 504. A communications interface generally governs and manages the user input and system output. There is no restriction on operating on any particular hardware arrangement and therefore the basic features here may easily be substituted for improved hardware or firmware arrangements as they are developed.

The one or more controllers 504 can include one or more communications interfaces for providing communication with the inputs 502 and the outputs 506. For example, the one or more controllers 504 can communicate with the inputs 502 and the outputs 506 through wired means or through wireless means (e.g., WiFi, cellular, satellite, Bluetooth, radio communications, etc.). In this way, the one or more controllers 504 are communicatively coupled to the plurality of sensors 14 and to the vehicle controls 18.

Figure 6:
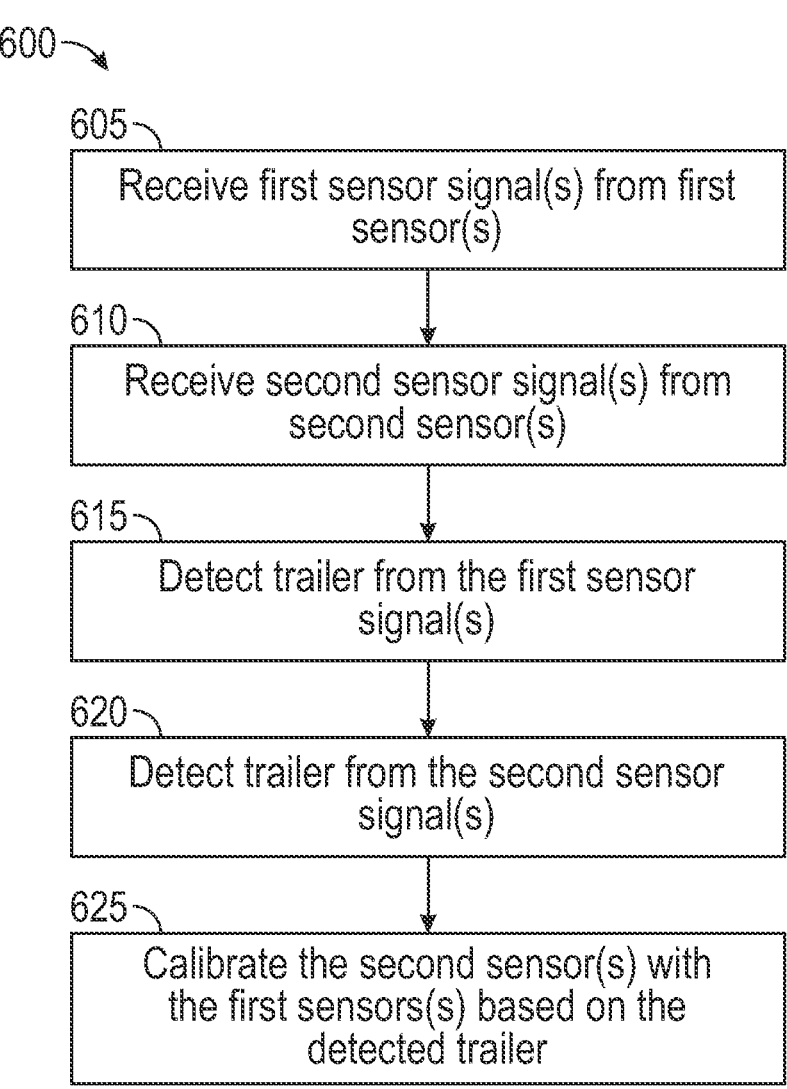
FIG. 6 is a flow diagram of a method of calibrating sensors for an autonomous vehicle, according to an embodiment of the present disclosure.

FIG. 6 is a flow diagram of a method 600 of calibrating sensors for an autonomous vehicle 10, according to an embodiment of the present disclosure. Reference will be made to FIGS. 1 to 5. The method 600 may be performed autonomously or semi-autonomously. That is, upon activation of the autonomous vehicle 10, the method 600 may begin autonomously by the one or more controllers 504. The method 600 may progress when the autonomous vehicle 10 is powered on. In some examples, the method 600 may progress when the autonomous vehicle 10 is already operating and the data from the sensors becomes misaligned and the sensors need to be recalibrated. In some examples, the method 600 may progress after the one or more controllers 504 have determined that a trailer 22 is attached to the autonomous vehicle 10. In some examples, the method 600 may progress while the autonomous vehicle 10 is operating autonomously, semi-autonomously, or operating offline (e.g., operated manually be a human operator). In some examples, the method 600 may progress while the autonomous vehicle 10 is moving.

In step 605, the one or more controllers 504 receive the first sensor signals 510 from one or more first sensors. The one or more first sensors may be any of the first sensors 14*a*. In step 610, the one or more controllers 504 receive the second sensor signals 512 from one or more second sensors. The one or more second sensors may be any of the second sensors 14*b*. The one or more first sensors generate a time series of data (e.g., timestamped data) based on the captured data and the first sensor signals 510 contain the time series of data. Similarly, the one or more second sensors generate a time series of data (e.g., timestamped data) based on the captured data and the second sensor signals 512 contain the time series of data. The one or more controllers 504 can read the time series of data (e.g., either online or offline).

In some examples, the one or more second sensors are the same type of sensor as the one or more first sensors but located on a different side of the autonomous vehicle 10. For example, the one or more first sensors can be the one or more first sensors 14a (e.g., the one or more first cameras 202a, the one or more first lidars 204a, or the one or more first radars 206a) located on the first side 15 of the autonomous vehicle 10 and the one or more second sensors can be the one or more second sensors 14b (e.g., the one or more second cameras 202b, the one or more second lidars 204b, or the one or more second radars 206b). In some examples, the one or more second sensors are a different type of sensor as the one or more first sensors and located on the same side of the autonomous vehicle 10 as the one or more first sensors. For example, the one or more first sensors can be the one or more cameras 202 (e.g., the one or more first cameras 202a or the one or more second cameras 202b) and the one or more second sensors can be the one or more lidars 204 (e.g., the one or more first lidars 204a or the one or more second lidars 204b). In some examples, the one or more first sensors or the one or more second sensors are the one or more radars 206 (e.g., the one or more first radars 206a or the one or more second radars 206b).

In step 615, the one or more controllers 504 detect the trailer 22 from the first sensor signals 510. While the exemplary embodiment details detecting the trailer 22 herein, the one or more controllers 504 can detect any vehicle feature of the autonomous vehicle 10 for calibrating the sensors. For example, the one or more controllers 504 can detect the first trailer side 23, the second trailer side 25, the tractor unit wheels 24, the trailer wheels 26, the one or more trailer edges 27, the stickable marker 410, or any other portion or feature of the autonomous vehicle 10. In step 620, the one or more controllers 504 detect the trailer 22 from the second sensor signals 512. In examples in which the second sensors are the same type of sensor as the first sensors, the one or more controllers 504 detect different components or features of the trailer 22. For example, the one or more controllers 504 can detect the first trailer side 23 in the first sensor signals 510 from the first sensors and can detect the second trailer side 25 in the second sensor signals 512 from the second sensors. In examples in which the second sensors are a different type of sensor as the first sensors, the one or more controllers 504 detect the same component or feature of the trailer 22. For example, the one or more controllers 504 can detect the one or more trailer edges 27 in the first sensor signals 510 from the first sensors and can detect the same one or more trailer edges 27 in the second sensor signals 512 from the second sensors.

In step 625, the one or more controllers 504 calibrate the one or more second sensors with the one or more first sensors based on the detected trailer 22. For example, the one or more controllers 504 can perform an extrinsic calibration process to determine relative sensor orientations of the sensors with respect to each other based on the detected trailer 22 (or otherwise based on the detected vehicle feature, described above). The one or more controllers 504 consider the intrinsic parameters of the one or more first sensors and of the one or more second sensors while performing the extrinsic calibration process. The extrinsic calibration process enables the one or more controllers 504 to more accurately detect objects in the environment about the autonomous vehicle 10. Utilizing the trailer 22 or other vehicle feature of the autonomous vehicle 10 in the calibration process provides for a known and consistent feature for calibration such that the one or more controllers 504 can perform the calibration process without the need for additional markers or targets common in current calibration processes without the benefit of the present disclosure. Accordingly, the method 600 detailed herein allows for a faster sensor calibration process compared to sensor calibration processes without the benefit of the present disclosure and allows for calibrating the sensors while the autonomous vehicle 10 is operating. In this way, the one or more controllers 504 can automatically recalibrate the sensors if the sensors become uncalibrated while the autonomous vehicle 10 is operating and there is no human operator present.

The calibration process for calibrating the same type of sensors of the autonomous vehicle 10 is detailed below in the method 700 with respect to FIG. 7. The calibration process for calibrating different types of sensors of the autonomous vehicle 10 is detailed below in the method 800 with respect to FIG. 8.

FIG. 7 is a flow diagram of a method 700 of calibrating sensors for an autonomous vehicle 10, according to another embodiment of the present disclosure. Reference will be made to FIGS. 1 to 5. The method 700 may be performed autonomously or semi-autonomously. That is, upon activation of the autonomous vehicle 10, the method 700 may begin autonomously by the one or more controllers 504. The method 700 may progress when the autonomous vehicle 10 is powered on. In some examples, the method 700 may progress when the autonomous vehicle 10 is already operating and the data from the sensors becomes misaligned and the sensors need to be recalibrated. In some examples, the method 700 may progress after the one or more controllers 504 have determined that a trailer 22 is attached to the autonomous vehicle 10. In some examples, the method 700 may progress while the autonomous vehicle 10 is operating autonomously, semi-autonomously, or operating offline (e.g., operated manually be a human operator). In some examples, the method 700 may progress while the autonomous vehicle 10 is moving.

In step 705, the one or more controllers 504 receive the first sensor signals 510 (e.g., time series of data) from one or more first sensors. The one or more first sensors may be any of the first sensors 14a. In step 710, the one or more controllers 504 receive the second sensor signals 512 (e.g., time series of data) from one or more second sensors. The one or more second sensors may be any of the second sensors 14b. In the method 700, the one or more second sensors are the same type of sensor as the one or more first sensors. In some examples, the one or more second sensors are located on a different side of the autonomous vehicle 10 than the one or more first sensors. In some examples, the one or more second sensors may be located on the same side of the autonomous vehicle 10 as the one or more first sensors but have a different field of view than the one or more first sensors. The one or more first sensors can be the one or more first sensors 14a (e.g., the one or more first cameras 202a, the one or more first lidars 204a, or the one or more first radars 206a) and the one or more second sensors can be the one or more second sensors 14b (e.g., the one or more second cameras 202b, the one or more second lidars 204b, or the one or more second radars 206b).

In step 715, the one or more controllers 504 detect the first trailer side 23 from the first sensor signals 510. While the exemplary embodiment details detecting the first trailer side 23 herein, the one or more controllers 504 can detect any vehicle feature on the first side 15 of the autonomous vehicle 10 for calibrating the sensors. For example, the one or more controllers 504 can detect the first trailer side 23, the second trailer side 25, the tractor unit wheels 24, the trailer wheels 26, the one or more trailer edges 27, the stickable marker 410, or any other portion or feature of the autonomous vehicle 10 on the first side 15 or the second side 17 of the autonomous vehicle 10. In step 720, the one or more controllers 504 detect the second trailer side 25 from the second sensor signals 512. In this way, the one or more controllers 504 detect different components or features of the trailer 22 or of the autonomous vehicle 10. For example, the one or more controllers 504 can detect a first plane defined by the first trailer side 23 and can detect a second plane defined by the second trailer side 25 since the first trailer side 23 and the second trailer side 25 define generally flat wall surfaces. In some examples, the one or more controllers 504 detect the same component or features of the trailer 22 or of the autonomous vehicle 10, but at different orientations of the one or more first sensors and the one or more second sensors.

In step 725, the one or more controllers 504 determine a first external parameter of the autonomous vehicle 10 based on the first trailer side 23 detected by the one or more first sensors 14*a*. In step 730, the one or more controllers 504 determine a second external parameter of the autonomous vehicle 10 based on the second trailer side 25 detected by the one or more second sensors 14*b*. The first external parameter and the second external parameter may each be the same type of parameter but may be different values due to the different orientations of the one or more first sensors 14*a* and the one or more second sensors 14*b* with respect to each other.

In some examples, the first external parameter and the second external parameter may be an angle of the trailer 22 with respect to the tractor unit 20 as the autonomous vehicle 10 operates. During the method 700, the autonomous vehicle 10 may operate and turn (e.g., in a circle pattern, in an oval pattern, or otherwise may turn) such that the tractor unit 20 turns and the trailer 22 pivots with respect to the tractor unit 20 during the turn. In this way, the trailer 22 is disposed at angle with respect to the tractor unit 20 during the turn. The one or more controllers 504 determine the angle of the trailer 22 with respect to the tractor unit 20 during the turn based on the first trailer side 23 detected by the one or more first sensors 14*a* to obtain a first value of the angle. The one or more controllers 504 also determine the angle of the trailer 22 with respect to the tractor unit 20 during the turn based on the second trailer side 25 detected by the one or more second sensors 14*b* to obtain a second value of the angle. Based on the different orientations of the one or more first sensors 14*a* and the one or more second sensors 14*b* with respect to each other, the second value of the angle may be different than the first value of the angle.

In step 735, the one or more controllers 504 calibrate the one or more second sensors 14*b* with the one or more first sensors 14*a* based on the first external parameter and the second external parameter. For example, the one or more controllers 504 perform a calibration process for the one or more first sensors 14*a* and the one or more second sensors 14*b* until the first external parameter and the second external parameter are substantially equal. The one or more controllers 504 consider the intrinsic parameters of the one or more first sensors and of the one or more second sensors while performing the calibration process.

During the calibration process, the one or more controllers 504 use the first trailer side 23 and the second trailer side 25 being parallel to each other as a cost function to change the external parameter readings of the one or more first sensors 14*a* and/or of the one or more second sensors 14*b* until the first external parameter and the second external parameter are substantially equal. For example, the one or more controllers 504 perform the calibration process until the determined first value of the angle of the trailer 22 with respect to the tractor unit 20 is substantially equal to the determined second value of the angle of the trailer 22 with respect to the tractor unit 20. In some examples, the one or more controllers 504 perform the calibration process by setting one sensor's (e.g., the one or more first sensors 14*a*) output in the other sensor's (e.g., the one or more second sensors 14*b*) coordinate system. In some examples, the one or more controllers 504 perform the calibration process by setting the output of the one or more first sensors 14*a* and the output of the one or more second sensors 14*b* in an intermediate coordinate system (e.g., a common coordinate system between the coordinate systems of the one or more first sensors 14*a* and the one or more second sensors 14*b*).

Thus, the one or more controllers 504 can calibrate the one or more first sensors 14*a* and the one or more second sensors 14*b* based on the trailer 22 or on another vehicle feature of the autonomous vehicle 10. In this way, the method 700 enables calibration of two or more sensors of the same type such that the one or more controllers 504 can more accurately detect objects in the environment about the autonomous vehicle 10. Utilizing the trailer 22, or another other vehicle feature of the autonomous vehicle 10, in the calibration process provides for a known and consistent feature for calibration such that the one or more controllers 504 can perform the calibration process without the need for additional markers or targets common in current calibration processes without the benefit of the present disclosure. Accordingly, the method 700 detailed herein allows for a faster calibration process for sensors of the same type as compared to calibration processes without the benefit of the present disclosure and allows for calibrating the sensors while the autonomous vehicle 10 is operating. In this way, the one or more controllers 504 can automatically recalibrate the sensors if the sensors become uncalibrated while the autonomous vehicle 10 is operating and there is no human operator present.

FIG. 8 is a flow diagram of a method 800 of calibrating sensors for an autonomous vehicle 10, according to another embodiment of the present disclosure. Reference will be made to FIGS. 1 to 5. The method 800 may be performed autonomously or semi-autonomously. That is, upon activation of the autonomous vehicle 10, the method 800 may begin autonomously by the one or more controllers 504. The method 800 may progress when the autonomous vehicle 10 is powered on. In some examples, the method 800 may progress when the autonomous vehicle 10 is already operating and the data from the sensors becomes misaligned and the sensors need to be recalibrated. In some examples, the method 800 may progress after the one or more controllers 504 have determined that a trailer 22 is attached to the autonomous vehicle 10. In some examples, the method 800 may progress while the autonomous vehicle 10 is operating autonomously, semi-autonomously, or operating offline (e.g., operated manually be a human operator). In some examples, the method 800 may progress while the autonomous vehicle 10 is moving.

In step 805, the one or more controllers 504 receive the first sensor signals 510 (e.g., time series of data) from one or more first sensors. The one or more first sensors may be any of the plurality of sensors 14 of one of the sensor assemblies 12. In step 810, the one or more controllers 504 receive the second sensor signals 512 (e.g., time series of data) from one or more second sensors. The one or more second sensors may be a different type of sensor than the one or more first sensors. In some examples, the one or more second sensors are on the same side (e.g., the first side 15 or the second side 17) of the autonomous vehicle 10. In some examples, the one or more second sensors are on the same sensor assembly 12 as the one or more first sensors. In the method 800, the one or more second sensors are a different type of sensor as the one or more first sensors but with a field of view (e.g., the second field of view 404) on the same side of the autonomous vehicle 10 as the field of view (e.g., the first field of view 402) of the one or more first sensors. For example, the one or more first sensors can be the one or more cameras 202 and the one or more second sensors can be the one or more lidars 204 located on the first side 15 of the autonomous vehicle 10. In some examples, the one or more first sensors or the one or more second sensors may be the one or more radars 206 located on the first side 15 of the autonomous vehicle 10.

In step 815, the one or more controllers 504 detect a vehicle feature of the autonomous vehicle 10 from the first sensor signals 510. For example, the one or more controllers 504 can detect the first trailer side 23, the second trailer side 25, the tractor unit wheels 24, the trailer wheels 26, the one or more trailer edges 27, the stickable marker 410, or any other portion or vehicle feature of the autonomous vehicle 10 on the first side 15 of the autonomous vehicle 10. In step 820, the one or more controllers 504 detect the vehicle feature from the second sensor signals 512. In this way, the one or more controllers 504 detect the same component or feature of the trailer 22 or of the autonomous vehicle 10 from the one or more first sensors and from the one or more second sensors.

In step 825, the one or more controllers 504 extract the vehicle feature from the first sensor signals 510 in a first coordinate system. For example, the first sensor signals 510 may generate data in the first coordinate system due to the orientation of the one or more first sensors. The one or more controllers 504 determine first coordinates of the extracted vehicle feature in the first coordinate system. The first coordinate system may be a three-dimensional (3D) coordinate system. In step 830, the one or more controllers 504 extract the vehicle feature from the second sensor signals 512 in a second coordinate system. For example, the second sensor signals 512 may generate data in the second coordinate system due to the orientation of the one or more second sensors. The one or more controllers 504 determine second coordinates of the extracted vehicle feature in the second coordinate system. The second coordinate system may be a 3D coordinate system. The second coordinates of the extracted vehicle feature may be different than the first coordinates of the extracted vehicle feature due to the various orientations and locations of the one or more first sensors and the one or more second sensors. Accordingly, the one or more controllers 504 may not accurately determine the location of detected objects from the one or more first sensors and the one or more second sensors. Therefore, the one or more controllers 504 calibrate the one or more second sensors with the one or more first sensors.

The one or more controllers 504 then perform a calibration process for the one or more first sensors and the one or more second sensors to align the second coordinates of the extracted vehicle feature with the first coordinates of the extracted vehicle feature. The calibration process includes the steps 835 and 840 detailed below. During the calibration process, the one or more controllers 504 use a deviation between the first coordinates and the second coordinates of the extracted vehicle feature (e.g., a feature of the trailer 22) as a cost function until the first coordinates and the second coordinates are substantially equal. In this way, the calibration process aligns the second coordinates and the first coordinates, as detailed further below. The one or more controllers 504 consider the intrinsic parameters of the one or more first sensors and of the one or more second sensors while performing the calibration process.

In step 835, the one or more controllers 504 compute a transform between the first coordinate system and the second coordinate system based on the extracted vehicle feature. The transform can include a rigid transformation matrix that consists of a rotation and a translation of the second coordinates to align the second coordinates with the first coordinates. In some examples, the transform includes a rigid transformation matrix that consists of a rotation and a translation of the first coordinates and of the second coordinates to align the first coordinates and the second coordinates with an intermediate coordinate system (e.g., a common coordinate system between the first coordinate system and the second coordinate system).

In step 840, the one or more controllers 504 calibrate the one or more second sensors with the one or more first sensors based on the computed transform. For example, the one or more controllers 504 transform the second coordinates of the extracted vehicle feature to the first coordinate system such that the second coordinates align with the first coordinates of the extracted vehicle feature. In some examples, the one or more controllers 504 transform the first coordinates to the second coordinate system such that the first coordinates align with the second coordinates. In some examples, the one or more controllers 504 transform both the first coordinates and the second coordinates to the intermediate coordinate system such that the first coordinates and the second coordinates align in the intermediate coordinate system.

Thus, the one or more second sensors are calibrated with the one or more first sensors. In this way, the data (e.g., point cloud data) from the one or more second sensors (e.g., the one or more lidars 204) may be projected or otherwise overlayed onto the data (e.g., images) from the one or more first sensors (e.g., the one or more cameras 202). Therefore, the one or more controllers 504 may accurately detect objects in the environment about the autonomous vehicle 10.

The method 800 enables calibration of two or more different types of sensors such that the one or more controllers 504 can more accurately detect objects in the environment about the autonomous vehicle 10. Utilizing the trailer 22 or other vehicle feature of the autonomous vehicle 10 in the calibration process provides for a known and consistent feature for calibration such that the one or more controllers 504 can perform the calibration process without the need for additional markers or targets common in current calibration processes without the benefit of the present disclosure. Accordingly, the method 800 detailed herein allows for a faster calibration process for different types of sensors as compared to calibration processes without the benefit of the present disclosure and allows for calibrating the sensors while the autonomous vehicle 10 is operating. In this way, the one or more controllers 504 can automatically recalibrate the sensors if the sensors become uncalibrated while the autonomous vehicle 10 is operating and there is no human operator present.

Figure 9:
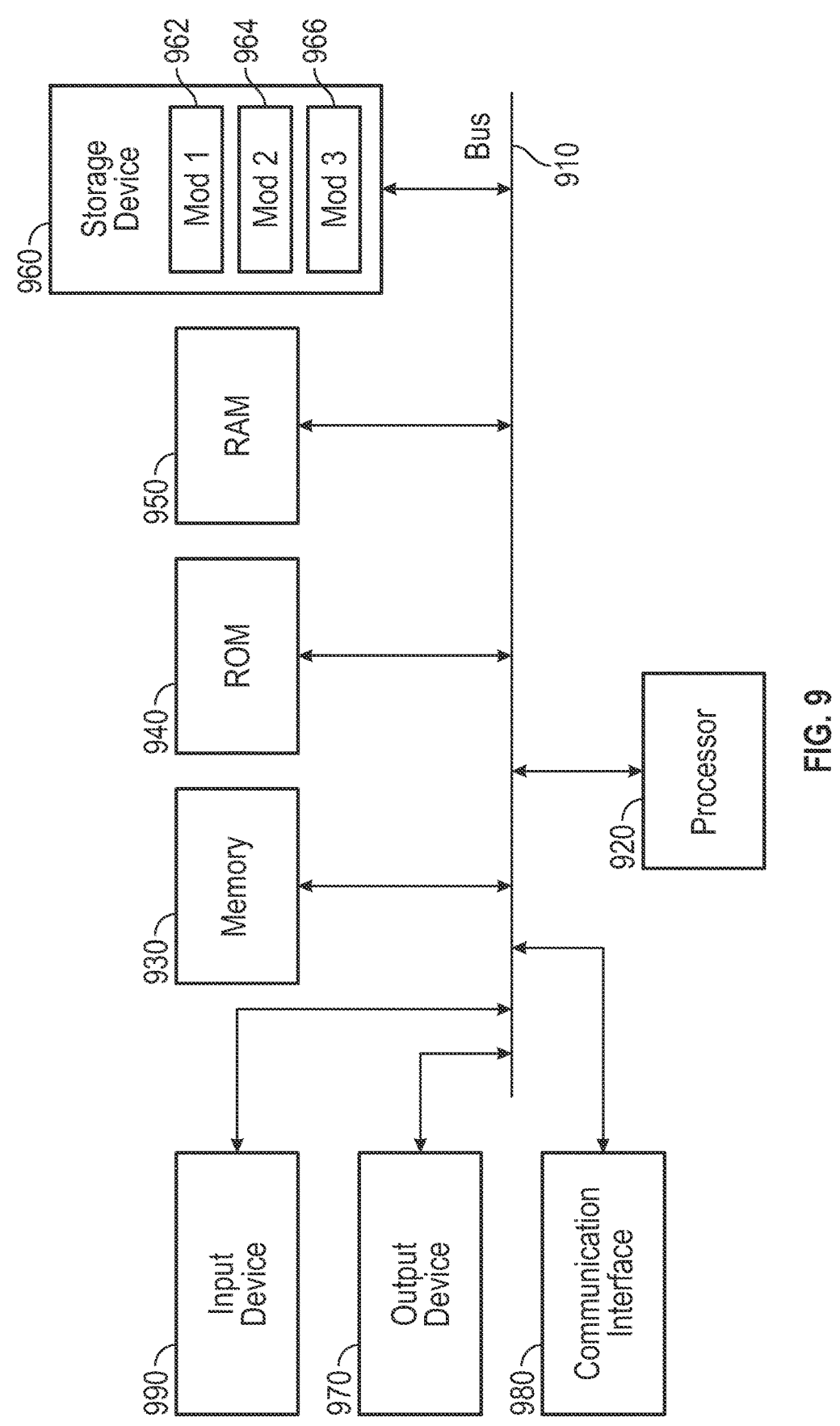
FIG. 9 illustrates a computing device, according to an embodiment of the present disclosure.

FIG. 9 illustrates an exemplary system that includes a general-purpose computing device 900, including a processing unit (CPU or processor) 920 and a system bus 910 that couples various system components including a memory 930 such as read-only memory (ROM) 940 and random-access memory (RAM) 950 to the processor 920. The computing device 900 can include a cache of high-speed memory connected directly with, in close proximity to, or integrated as part of the processor 920. The computing device 900 copies data from the memory 930 and/or the storage device 960 to the cache for quick access by the processor 920. In this way, the cache provides a performance boost that avoids processor 920 delays while waiting for data. These and other modules can control or be configured to control the processor 920 to perform various actions. Other memory 930 may be available for use as well. The memory 930 can include multiple different types of memory with different performance characteristics. It can be appreciated that the disclosure may operate on a computing device 900 with more than one processor 920 or on a group or cluster of computing devices networked together to provide greater processing capability. The processor 920 can include any general-purpose processor and a hardware module or software module, such as module 1 962, module 2 964, and module 3 966 stored in storage device 960, configured to control the processor 920 as well as a special-purpose processor where software instructions are incorporated into the actual processor design. The processor 920 may essentially be a completely self-contained computing system, containing multiple cores or processors, a bus, memory controller, cache, etc. A multi-core processor may be symmetric or asymmetric.

The system bus 910 may be any of several types of bus structures including a memory bus or memory controller, a peripheral bus, and a local bus using any of a variety of bus architectures. A basic input/output (BIOS) stored in ROM 940 or the like, may provide the basic routine that helps to transfer information between elements within the computing device 900, such as during start-up. The computing device 900 further includes storage devices 960 such as a hard disk drive, a magnetic disk drive, an optical disk drive, tape drive or the like. The storage device 960 can include software modules 962, 964, 966 for controlling the processor 920. Other hardware or software modules are contemplated. The storage device 960 is connected to the system bus 910 by a drive interface. The drives and the associated computer-readable storage media provide nonvolatile storage of computer-readable instructions, data structures, program modules and other data for the computing device 900. In one aspect, a hardware module that performs a particular function includes the software component stored in a tangible computer-readable storage medium in connection with the necessary hardware components, such as the processor 920, system bus 910, output device 970, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computing device 900 is a small, handheld computing device, a desktop computer, or a computer server.

Although the exemplary embodiment described herein employs the storage device 960, other types of computer-readable media which can store data that are accessible by a computer, such as magnetic cassettes, flash memory cards, digital versatile disks, cartridges, random-access memories (RAMs) 950, and read-only memory (ROM) 940, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 900, an input device 990 represents any number of input mechanisms, such as a microphone for speech, a touch-sensitive screen for gesture or graphical input, keyboard, mouse, motion input, speech and so forth. An output device 970 can also be one or more of a number of output mechanisms known to those of skill in the art, such as, for example, a display. In some instances, multimodal systems enable a user to provide multiple types of input to communicate with the computing device 900. The communications interface 980 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Further aspects of the present disclosure are provided by the subject matter of the following clauses.

A method of calibrating sensors for an autonomous vehicle includes detecting a first vehicle feature of the autonomous vehicle from one or more first sensors of the autonomous vehicle, detecting a second vehicle feature of the autonomous vehicle from one or more second sensors of the autonomous vehicle, and calibrating the one or more second sensors with the one or more first sensors based on the first vehicle feature and the second vehicle feature.

The method of the preceding clause, wherein the first vehicle feature and the second vehicle feature are at least one of wheels of the autonomous vehicle, a side of the autonomous vehicle, an edge of the autonomous vehicle, or a stickable marker on the autonomous vehicle.

The method of any preceding clause, wherein the first vehicle feature is a first trailer feature of a trailer of the autonomous vehicle, and the second vehicle feature is a second trailer feature of the trailer.

The method of any preceding clause, wherein calibrating the one or more second sensors with the one or more first sensors comprises calibrating the one or more second sensors with the one or more first sensors based on the trailer.

The method of any preceding clause, wherein the first vehicle feature is a first trailer side of the trailer of the autonomous vehicle, and the second vehicle feature is a second trailer side of the trailer.

The method of any preceding clause, wherein the second vehicle feature is different than the first vehicle feature.

The method of any preceding clause, wherein the one or more second sensors are a same type of sensor as the one or more first sensors.

The method of any preceding clause, wherein calibrating the one or more second sensors with the one or more first sensors comprises: determining a first external parameter based on the first vehicle feature; determining a second external parameter based on the second vehicle feature; and calibrating the one or more second sensors with the one or more first sensors based on the first external parameter and the second external parameter.

The method of any preceding clause, wherein calibrating the one or more second sensors with the one or more first sensors further comprises changing the first external parameter or the second external parameter until the first external parameter and the second external parameter are substantially equal.

The method of any preceding clause, wherein the second vehicle feature is a same vehicle feature as the first vehicle feature.

The method of any preceding clause, wherein the one or more second sensors and the one or more first sensors are different types of sensors.

The method of any preceding clause, wherein calibrating the one or more second sensors with the one or more first sensors comprises: determining first coordinates of the first vehicle feature in a first coordinate system; determining second coordinates of the second vehicle feature in a second coordinate system; computing a transform between the first coordinate system and the second coordinate system based on the first coordinates and the second coordinates; and calibrating the one or more second sensors with the one or more first sensors based on the transform.

A system for calibrating sensors for an autonomous vehicle, the system comprising: one or more first sensors; one or more second sensors; and one or more controllers configured to: detect a first vehicle feature of the autonomous vehicle from the one or more first sensors; detect a second vehicle feature of the autonomous vehicle from the one or more second sensors; and calibrate the one or more second sensors with the one or more first sensors based on the first vehicle feature and the second vehicle feature.

The system of the preceding clause, wherein the first vehicle feature and the second vehicle feature are at least one of wheels of the autonomous vehicle, a side of the autonomous vehicle, an edge of the autonomous vehicle, or a stickable marker on the autonomous vehicle.

The system of any preceding clause, wherein the first vehicle feature is a first trailer feature of a trailer of the autonomous vehicle, and the second vehicle feature is a second trailer feature of the trailer.

The system of any preceding clause, wherein calibrating the one or more second sensors with the one or more first sensors comprises the one or more controllers configured to calibrate the one or more second sensors with the one or more first sensors based on the trailer.

The system of any preceding clause, wherein the first vehicle feature is a first trailer side of the trailer of the autonomous vehicle, and the second vehicle feature is a second trailer side of the trailer.

The system of any preceding clause, wherein the second vehicle feature is different than the first vehicle feature.

The system of any preceding clause, wherein the one or more second sensors are a same type of sensor as the one or more first sensors.

The system of any preceding clause, wherein calibrating the one or more second sensors with the one or more first sensors comprises the one or more controllers configured to: determine a first external parameter based on the first vehicle feature; determine a second external parameter based on the second vehicle feature; and calibrate the one or more second sensors with the one or more first sensors based on the first external parameter and the second external parameter.

The system of any preceding clause, wherein calibrating the one or more second sensors with the one or more first sensors further comprises the one or more controllers configured to change the first external parameter or the second external parameter until the first external parameter and the second external parameter are substantially equal.

The system of any preceding clause, wherein the second vehicle feature is a same vehicle feature as the first vehicle feature.

The system of any preceding clause, wherein the one or more second sensors and the one or more first sensors are different types of sensors.

The system of any preceding clause, wherein calibrating the one or more second sensors with the one or more first sensors comprises the one or more controllers configured to: determine first coordinates of the first vehicle feature in a first coordinate system; determine second coordinates of the second vehicle feature in a second coordinate system; compute a transform between the first coordinate system and the second coordinate system based on the first coordinates and the second coordinates; and calibrate the one or more second sensors with the one or more first sensors based on the transform.

A tangible non-transitory computer-readable storage media, the tangible non-transitory computer-readable storage media storing computer-executable instructions executable by one or more processors, the computer-executable instructions including one or more instructions to: detect a first vehicle feature of an autonomous vehicle from one or more first sensors of the autonomous vehicle; detect a second vehicle feature of the autonomous vehicle from one or more second sensors of the autonomous vehicle; and calibrate the one or more second sensors with the one or more first sensors based on the first vehicle feature and the second vehicle feature.

The tangible non-transitory computer-readable storage media of the preceding clause, wherein the first vehicle feature and the second vehicle feature are at least one of wheels of the autonomous vehicle, a side of the autonomous vehicle, an edge of the autonomous vehicle, or a stickable marker on the autonomous vehicle.

The tangible non-transitory computer-readable storage media of any preceding clause, wherein the first vehicle feature is a first trailer feature of a trailer of the autonomous vehicle, and the second vehicle feature is a second trailer feature of the trailer.

The tangible non-transitory computer-readable storage media of any preceding clause, wherein the computer-executable instructions include one or more instructions to calibrate the one or more second sensors with the one or more first sensors based on the trailer.

The tangible non-transitory computer-readable storage media of any preceding clause, wherein the first vehicle feature is a first trailer side of the trailer of the autonomous vehicle, and the second vehicle feature is a second trailer side of the trailer.

The tangible non-transitory computer-readable storage media of any preceding clause, wherein the second vehicle feature is different than the first vehicle feature.

The tangible non-transitory computer-readable storage media of any preceding clause, wherein the one or more second sensors are a same type of sensor as the one or more first sensors.

The tangible non-transitory computer-readable storage media of any preceding clause, wherein the computer-executable instructions include one or more instructions to: determine a first external parameter based on the first vehicle feature; determine a second external parameter based on the second vehicle feature; and calibrate the one or more second sensors with the one or more first sensors based on the first external parameter and the second external parameter.

The tangible non-transitory computer-readable storage media of any preceding clause, wherein the computer-executable instructions include one or more instructions to change the first external parameter or the second external parameter until the first external parameter and the second external parameter are substantially equal.

The tangible non-transitory computer-readable storage media of any preceding clause, wherein the second vehicle feature is a same vehicle feature as the first vehicle feature.

The tangible non-transitory computer-readable storage media of any preceding clause, wherein the one or more second sensors and the one or more first sensors are different types of sensors.

The tangible non-transitory computer-readable storage media of any preceding clause, wherein the computer-executable instructions include one or more instructions to: determine first coordinates of the first vehicle feature in a first coordinate system; determine second coordinates of the second vehicle feature in a second coordinate system; compute a transform between the first coordinate system and the second coordinate system based on the first coordinates and the second coordinates; and calibrate the one or more second sensors with the one or more first sensors based on the transform.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. A method of calibrating sensors for an autonomous vehicle including a forward end, a rear end, a first side extending between the forward end and the rear end, and a second side extending between the forward end and the rear end and being opposite the first side, the method comprising:
    detecting the first side of the autonomous vehicle from one or more first sensors of the autonomous vehicle, the one or more first sensors mounted on the first side of the autonomous vehicle and having a first field of view of the first side;
    detecting the second side of the autonomous vehicle from one or more second sensors of the autonomous vehicle, the one or more second sensors mounted on the second side of the autonomous vehicle and having a second field of view of the second side; and
    calibrating the one or more second sensors with the one or more first sensors based on detecting the first side with the one or more first sensors and detecting the second side with the one or more second sensors.

2. The method of claim 1, wherein the first side includes a first stickable marker thereon and the second side includes a second stickable marker thereon.

3. The method of claim 1, wherein detecting the first side includes detecting is a first trailer feature of a trailer of the autonomous vehicle, and detecting the second side includes detecting is a second trailer feature of the trailer.

4. The method of claim 3, wherein calibrating the one or more second sensors with the one or more first sensors comprises calibrating the one or more second sensors with the one or more first sensors based on the trailer.

5. The method of claim 3, wherein the first trailer feature is a first trailer side of the trailer of the autonomous vehicle, and the second trailer vehicle is a second trailer side of the trailer.

6. The method of claim 3, wherein the second trailer feature is different than the first trailer feature.

7. The method of claim 3, wherein the second trailer feature is a same vehicle feature as the first trailer feature.

8. The method of claim 1, wherein the one or more second sensors are a same type of sensor as the one or more first sensors.

9. The method of claim 8, wherein calibrating the one or more second sensors with the one or more first sensors comprises:
    determining a first external parameter based on the first side;
    determining a second external parameter based on the second side; and
    calibrating the one or more second sensors with the one or more first sensors based on the first external parameter and the second external parameter.

10. The method of claim 9, wherein calibrating the one or more second sensors with the one or more first sensors further comprises changing the first external parameter or the second external parameter until the first external parameter and the second external parameter are equal.

11. The method of claim 1, wherein the one or more second sensors and the one or more first sensors are different types of sensors.

12. The method of claim 11, wherein calibrating the one or more second sensors with the one or more first sensors comprises:
    determining first coordinates of the first side in a first coordinate system;
    determining second coordinates of the second side in a second coordinate system;
    computing a transform between the first coordinate system and the second coordinate system based on the first coordinates and the second coordinates; and
    calibrating the one or more second sensors with the one or more first sensors based on the transform.

13. A system for calibrating sensors for an autonomous vehicle including a forward end, a rear end, a first side extending between the forward end and the rear end, and a second side extending between the forward end and the rear end and being opposite the first side, the system comprising:
    one or more first sensors mounted on the first side of the autonomous vehicle and having a first field of view of the first side;
    one or more second sensors mounted on the second side of the autonomous vehicle and having a second field of view of the second side; and
    one or more controllers configured to:
        detect the first side of the autonomous vehicle from the one or more first sensors;
        detect the second side of the autonomous vehicle from the one or more second sensors; and
        calibrate the one or more second sensors with the one or more first sensors based on detecting the first side with the one or more first sensors and detecting the second side with the one or more second sensors.

14. The system of claim 13, wherein the first side includes a first stickable marker thereon and the second side includes a second stickable marker thereon.

15. The system of claim 13, wherein detecting the first side includes detecting is a first trailer feature of a trailer of the autonomous vehicle, and detecting the second side includes detecting is a second trailer feature of the trailer.

16. The system of claim 15, wherein calibrating the one or more second sensors with the one or more first sensors comprises the one or more controllers configured to calibrate the one or more second sensors with the one or more first sensors based on the trailer.

17. The system of claim 15, wherein the first trailer feature is a first trailer side of the trailer of the autonomous vehicle, and the second trailer feature is a second trailer side of the trailer.

18. The system of claim 15, wherein the second trailer feature is different than the first trailer feature.

19. The system of claim 15, wherein the second trailer feature is a same vehicle feature as the first trailer feature.

20. The system of claim 13, wherein the one or more second sensors are a same type of sensor as the one or more first sensors.

21. The system of claim 20, wherein calibrating the one or more second sensors with the one or more first sensors comprises the one or more controllers configured to:
  determine a first external parameter based on the first side;
  determine a second external parameter based on the second side; and
  calibrate the one or more second sensors with the one or more first sensors based on the first external parameter and the second external parameter.

22. The system of claim 21, wherein calibrating the one or more second sensors with the one or more first sensors further comprises the one or more controllers configured to change the first external parameter or the second external parameter until the first external parameter and the second external parameter are equal.

23. The system of claim 13, wherein the one or more second sensors and the one or more first sensors are different types of sensors.

24. The system of claim 23, wherein calibrating the one or more second sensors with the one or more first sensors comprises the one or more controllers configured to:
  determine first coordinates of the first side in a first coordinate system;
  determine second coordinates of the second side in a second coordinate system;
  compute a transform between the first coordinate system and the second coordinate system based on the first coordinates and the second coordinates; and
  calibrate the one or more second sensors with the one or more first sensors based on the transform.

25. A tangible non-transitory computer-readable storage media, the tangible non-transitory computer-readable storage media storing computer-executable instructions executable by one or more processors, the computer-executable instructions including one or more instructions to:
  detect a first side of an autonomous vehicle from one or more first sensors of the autonomous vehicle, the autonomous vehicle including a forward end, a rear end, the first side extending between the forward end and the rear end, and a second side extending between the forward end and the rear end and being opposite the first side, the one or more first sensors mounted on the first side of the autonomous vehicle and having a first field of view of the first side;
  detect the second side of the autonomous vehicle from one or more second sensors of the autonomous vehicle, the one or more second sensors mounted on the second side of the autonomous vehicle and having a second field of view of the second side; and
  calibrate the one or more second sensors with the one or more first sensors based on detecting the first side with the one or more first sensors and detecting the second side with the one or more second sensors.

26. The tangible non-transitory computer-readable storage media of claim 25, wherein the first side includes a first stickable marker thereon and the second side includes a second stickable marker thereon.

27. The tangible non-transitory computer-readable storage media of claim 25, wherein detecting the first side includes detecting a first trailer feature of a trailer of the autonomous vehicle, and detecting the second side includes detecting a second trailer feature of the trailer.

28. The tangible non-transitory computer-readable storage media of claim 27, wherein the computer-executable instructions include one or more instructions to calibrate the one or more second sensors with the one or more first sensors based on the trailer.

29. The tangible non-transitory computer-readable storage media of claim 27, wherein the first trailer feature is a first trailer side of the trailer of the autonomous vehicle, and the second trailer feature is a second trailer side of the trailer.

30. The tangible non-transitory computer-readable storage media of claim 27, wherein the second trailer feature is different than the first trailer feature.

31. The tangible non-transitory computer-readable storage media of claim 27, wherein the second trailer feature is a same vehicle feature as the first trailer feature.

32. The tangible non-transitory computer-readable storage media of claim 31, wherein the computer-executable instructions include one or more instructions to:
  determine first coordinates of the first side in a first coordinate system;
  determine second coordinates of the second side in a second coordinate system;
  compute a transform between the first coordinate system and the second coordinate system based on the first coordinates and the second coordinates; and
  calibrate the one or more second sensors with the one or more first sensors based on the transform.

33. The tangible non-transitory computer-readable storage media of claim 25, wherein the one or more second sensors are a same type of sensor as the one or more first sensors.

34. The tangible non-transitory computer-readable storage media of claim 33, wherein the computer-executable instructions include one or more instructions to:
  determine a first external parameter based on the first side;
  determine a second external parameter based on the second side; and
  calibrate the one or more second sensors with the one or more first sensors based on the first external parameter and the second external parameter.

35. The tangible non-transitory computer-readable storage media of claim 34, wherein the computer-executable instructions include one or more instructions to change the first external parameter or the second external parameter until the first external parameter and the second external parameter are equal.

36. The tangible non-transitory computer-readable storage media of claim 25, wherein the one or more second sensors and the one or more first sensors are different types of sensors.

* * * * *